United States Patent Office 3,245,916
Patented Apr. 12, 1966

3,245,916
STABLE ANHYDRIDE MIXTURES
Marvin Z. Woskow, Houston, Tex., assignor to Petro-Tex Chemical Corporation, Houston, Tex., a corporation of Delaware
No Drawing. Filed Nov. 8, 1962, Ser. No. 236,437
8 Claims. (Cl. 252—182)

This invention relates to stabilized low-melting or eutectic mixtures of acid anhydrides.

Liquid epoxy resins are produced by combining bisphenol-A [2,2-bis(p-hydroxyphenyl)propane] with epichlorohydrin in the presence of sodium hydroxide which may then be hardened or cured into tough, hard, thermoset solids by adding thereto specific amounts of acid anhydrides. Epoxy resins and the curing thereof are described in "Epoxy Resins Their Application and Technology," Lee and Neville, McGraw-Hill Book Co., Inc. (1957), with particular reference to pages 3–14 and 115–139.

Typical linear and cyclic acid anhydrides that may be employed in curing or hardening epoxy resins generally contain from about 4 to 25 carbon atoms per molecule of acid anhydride. Examples of such anhydrides include aliphatic linear monobasic acid anhydrides such as propionic anhydride, acetic anhydride, acetyl butyrate and the like; aromatic linear monobasic acid anhydrides such as benzoic anhydride and the like; aliphatic cyclic polybasic acid anhydrides such as maleic anhydride, succinic anhydride, and the like, aromatic cyclic polybasic acid anhydrides such as trimellitic anhydride, pyromellitic anhydride, phthalic anhydride and the like. A preferred group of cyclic acid anhydrides contain 4 to 8 carbon atoms; however, such anhydrides may contain additional carbon atoms attached to the cyclic member. Certain cyclic dibasic acid anhydrides derived from maleic anhydride are of particular importance and include for example, dodecenylsuccinic anhydride, hexahydrophthalic anhydride, tetrahydrophthalic anhydride, nonenylsuccinic anhydride, isatoic anhydride, chlorendic anhydride, and the like. Most of the above anhydrides are solid at room temperature and have the disadvantage of being only partially soluble in liquid epoxy resins at room temperature. To insure proper mixing of the ingredients and to avoid precipitation of the polybasic acid anhydrides during the curing and casting process, an elevated temperature must be utilized throughout the operation to maintain the ingredients in liquid phase. Operation at these elevated temperatures is cumbersome and creates undesired operational limitations and may affect the physical properties of the cured epoxy resin.

While the problems associated with the use of solid anhydrides may be avoided by using liquid acid anhydrides or low-melting or eutectic mixtures of specific acid anhydrides, it has been noted that liquid acid anhydrides, and in particular the low-melting or eutectic mixtures of polybasic acid anhydrides decompose upon standing and form a precipitous substance. In some instances decomposition was noted as soon as the individual molten anhydrides were combined and cooled. Although the nature of the decomposition of the anhydride mixture is not fully understood, the precipitate that develops seriously hinders the use of low-melting or eutectic mixtures of polybasic acid anhydrides.

It is, therefore, an object of this invention to provide stabilized low-melting mixtures of polybasic acid anhydrides which resist decomposition. Another object of this invention is to provide stabilized eutectic mixtures of cyclic dibasic acid anhydrides. A further object of this invention is to provide stabilized mixtures of maleic anhydride and anhydride derivatives thereof, particularly eutectic mixtures that are liquid at temperatures from about 0° C. to 30° C. A still further object of this invention is to provide a stabilized epoxy resin curing agent that is liquid at ambient temperatures. Still another object of this invention is to provide a process for stabilizing low-melting mixtures of polybasic acid anhydrides. Another object is to provide an improved process for curing epoxy resins with stabilized low-melting or eutectic mixtures of polybasic acid anhydrides. Other objects of this invention will be apparent from the disclosure which follows.

It was unexpectedly found that these objects are accomplished by adding to a mixture of two or more polybasic acid anhydrides an organic compound containing at least one carbinol group

A variety of carbinol-containing compounds, such as aliphatic, aromatic, and cyclic mono- and polyhydric alcohols and mixtures thereof may be utilized in formulating stabilized liquid mixtures of polybasic acid anhydrides. Specific examples of such compounds include saturated aliphatic monohydric alcohols such as, methyl alcohol, ethyl alcohol, n-propyl alcohol, isopropyl alcohol, isobutyl alcohol, tert-butyl alcohol and the like; ethylenically unsaturated aliphatic monohydric alcohols such as allyl alcohol and the like; aromatic alcohols such as benzyl alcohol, α-phenylethyl alcohol, β-phenylethyl alcohol, cinnamyl alcohol, triphenyl carbinol, salicyl alcohol, and the like; saturated aliphatic polyhydric alcohols, such as ethylene glycol, diethylene glycol, propylene glycol, 1,2-butanediol, pentamethylene glycol, glycerol, erythritol, xylitol, sorbitol and the like; cyclic polyhydric alcohols, such as pentahydroxycyclohexane, hexahydroxycyclohexane, and the like. Various derivatives of aliphatic mono- and polyhydric alcohols, such as the halogen derivatives, including glyceryl monochlorohydrin, have also been found to be useful. Alcohols containing 1 to 12 carbon atoms and 1 to 8 hydroxyl groups are generally used. Saturated aliphatic alcohols containing 1 to 6 carbon atoms and 1 to 5 hydroxyl groups are preferred. For example, the polyhydric alcohols such as ethylene glycol and propylene glycol and the monohydric alcohols such as methanol and isopropanol are generally preferred for commercial use.

The amount of alcohol that is required to stabilize a liquid mixture of acid anhydrides may be varied over a wide range. Generally good results have been obtained by adding to the acid anhydride mixture a mono- or polyhydric alcohol in an amount above 0.001 percent to about 10 percent by weight of the total anhydride mixture, although larger amounts, while not necessary, may be used. A mono- or polyhydric alcohol in an amount between about 0.02 to 4 percent by weight of the total anhydride mixture is preferred and excellent results obtained.

Where the stabilized liquid anhydride is exposed to the atmosphere, in handling or storage, larger quantities of the stabilizing alcohol may be required. Since the alcohols may be consumed, in part, while functioning as stabilizing or inhibiting agents, the amount of alcohol initially introduced depends on the length of time as well as the conditions under which the anhydrides are to be stored.

The low-melting or eutectic anhydride mixture is generally composed of at least two acid anhydrides although more may be used. For example, a 100 part mixture containing between 10 to 50 parts of maleic anhydride and 50 to 90 parts hexahydrophthalic anhydride will possess a melting point below 23° C. A 100 part mixture containing between 10 to 27 parts of tetrahydrophthalic anhydride and 73 to 90 parts hexahydrophthalic anhydride will also possess a melting point of below 23° C. Various other low-melting anhydride combinations may be employed, for example, chlorendic and hexahydrophthalic anhydride; propionic acid and pyromellitic anhydride; maleic and tetrahydrophthalic anhydride and the like.

The procedure for formulating stabilized liquid polybasic acid anhydride mixtures will usually consist in first melting the polybasic acid anhydrides and adding thereto the desired amount of stabilizing alcohol compound. The mixture during or after mixing, is heated to a temperature above 80° C., and preferably to a temperature between about 90° C. and 150° C. The alcohol-anhydride mixture is held at this elevated temperature until all visible traces of gaseous impurities have been evolved. Usually five to ten minutes at the elevated temperature is sufficient, although a longer period of time may be used. It is also advisable, although it is not essential, to purge the vapor space above the liquid anhydride mixture during the heating and cooling process with a dry inert gas or material substantially inert to the ingredients. The stabilized anhydride mixture may also be maintained under a dry inert atmosphere while in transit or storage. Dry inert materials that may be suitably employed include such materials as methane, carbon dioxide, helium, nitrogen, and the like.

The effect of adding a specified amount of a mono- or polyhydric alcohol to a low-melting or eutectic mixture of polybasic anhydrides is demonstrated in the following examples.

*Example 1*

Three low-melting liquid anhydride samples were prepared by melting together approximately 850 g. of hexahydrophthalic anhydride and 150 g. of tetrahydrophthalic anhydride in three containers. 20 g. of ethylene glycol was added to one of the liquid anhydride samples and 20 g. of methanol was added to the second sample. The third sample, serving as the control, contained no alcohol additive. All three samples were shaken and then heated to about 150° C. and maintained at this elevated temperature for about 10 minutes prior to being capped. The three samples were then allowed to cool and were stored over an extended period of time. The samples were periodically examined for signs of decomposition. Over a period of three months, the samples containing the ethylene glycol and methanol gave no visible indication of decomposition. The control sample began forming a white insoluble precipitate almost immediately after being capped and after about 100 hours, substantial quantities of this white insoluble substance had precipitated. At the end of a three-month storage period at a temperature of about 23° C., the anhydride samples containing the ethylene glycol and methanol were solidified by cooling the anhydride mixtures to about 5° C. After about 24 hours the solid anhydride mixtures were liquified by heating and examined. Visual examination of the samples gave no indication of anhydride decomposition even after solidification and remelting.

*Example 2*

Three more liquid anhydride samples were prepared as in the previous Example 1. The entire procedure was duplicated with one exception; the three liquid anhydride samples were heated to 100° C. and maintained at this temperature for about 5 minutes instead of 150° C. for 10 minutes. The hexahydrophthalic-tetrahydrophthalic anhydride mixture containing (1) ethylene glycol and (2) methanol, showed no indication of decomposition after a three-month period while the control anhydride mixtures produced substantial quantities of a white precipitate after only about 12 hours.

Other low-melting or eutectic polybasic acid anhydride mixtures may be prepared by the procedure described above, for example, maleic anhydride and tetrahydrophthalic anhydride in proportion of about 50 to 70 percent maleic anhydride; and maleic anhydride and hexahydrophthalic anhydride in proportion of about 10 to 90 percent maleic anhydride. In each case the addition of small amounts of a mono- or polyhydric alcohol or mixtures thereof to these anhydride mixtures produced a stabilized low-melting or eutectic anhydride mixture. Similarly, when a liquid mixture of about 20 to 40 parts of 1,4,5,6,7,7-hexachlorobicyclic-(2,2,1)-5-heptane-2,3-dicarboxylic anhydride, about 60 to 80 parts of hexahydrophthalic anhydride, and about 2 weight percent of ethylene glycol are prepared and the sample heated to about 150° C. and maintained at that temperature for about 5 minutes before being capped and cooled, after a three-month period this stabilized low-melting mixture shows no visible signs of decomposition.

*Example 3*

In order to demonstrate the curing characteristics of the stabilized anhydride mixtures with epoxy resins, twenty gallons of a stabilized low-melting anhydride mixture was prepared as follows: 143.5 pounds of hexahydrophthalic anhydride, 21 pounds of tetrahydrophthalic anhydride and 2.25 pounds of ethylene glycol were placed in a 30-gallon, glass-lined steam-jacketed, Pfaudler autoclave. The anhydride-alcohol mixture was thoroughly mixed by a motor-driven, propeller-type mixing device and heated until a temperature of about 150° C. was obtained. During the heating process a slow stream of nitrogen was passed into the autoclave to remove any traces of gaseous or vapor impurities that may have been evolved. After a temperature of about 150° C. was reached and maintained for about 5 minutes, the steam was turned off and the stabilized eutectic anhydride was placed in one-gallon cans that had been purged with dry nitrogen and capped. After a three-month period there was no indication of decomposition in any of the stored samples. After being stored for about three months, 1.8 pounds of the stabilized eutectic anhydride was combined with 2.0 pounds of a commercial epoxy resin, Epon 828 (a product which is a reaction product of epichlorohydrin with bis-phenol A), and the mixture cured at room temperatures. A second sample was cured for one hour at 100° C. and a third sample containing about 0.2 percent of a tertiary amine catalyst was cured at room temperature. In all three samples, the epoxy resins produced were of superior quality. The term "low-melting" is meant to include any anhydride mixture which contains two or more polybasic acid anhydrides which when combined have a melting point below one of the combined polybasic acid anhydrides.

Low-melting or eutectic mixtures of polybasic acid anhydrides are useful not only in the production of epoxy resins but also in the production of polyesters as well as the production of numerous other polymer formulations.

I claim:

1. A stable composition of matter consisting essentially of a stabilized mixture of at least two cyclic polybasic acid anhydrides which is liquid at temperatures from about 0° C. to 30° C. containing 4 to 8 carbon atoms and an alcohol having 1 to 12 carbon atoms and 1 to 6 hydroxyl groups in an amount from about 0.001 to 10 percent by weight of said anhydride mixture.

2. A composition of matter consisting essentially of a stabilized mixture of at least two cyclic dibasic acid anhydrides which is liquid at temperatures from about 0° C. to 30° C. containing 4 to 8 carbon atoms and an aliphatic monohydric alcohol containing 1 to 4 carbon atoms in an amount between about 0.02 to 4 percent by weight of said anhydride mixture.

3. A stable cyclic dibasic acid anhydride mixture which is liquid at temperatures from about 0° C. to 30° C. consisting essentially of about 10 to 50 weight parts of maleic anhydride and 50 to 90 weight parts of hexahydropthalic anhydride and an aliphatic alcohol containing 1 to 6 carbon atoms and 1 to 5 hydroxyl groups in amount between about 0.02 to 4 percent by weight of said anhydride mixture, 4. A stable cyclic dibasic acid anhydride mixture which is liquid at temperatures from about 0° C. to 30° C. consisting essentially of about 10 to 27 weight parts of tetrahydrophthalic anhydride and about 73 to 90 weight parts of hexahydrophthalic anhydride and an aliphatic alcohol containing 1 to 6 carbon atoms and 1 to 5 hydroxyl groups in amount between about 0.02 to 4 percent by weight of said anhydride mixture.

5. A stable cyclic dibasic acid anhydride mixture which is liquid at temperatures from about 0° C. to 30° C. consisting essentially of about 10 to 50 weight parts of maleic anhydride and 50 to 90 weight parts of hexahydrophthalic anhydride and ethylene glycol in an amount between about 0.02 to 4 percent by weight of said anhydride mixture.

6. A stable cyclic dibasic acid anhydride mixture which is liquid at temperatures from about 0° C. to 30° C. consisting essentially of about 10 to 50 weight parts of maleic anhydride and 50 to 90 weight parts of hexahydrophthalic anhydride and methanol in an amount between about 0.02 to 4 percent by weight of said anhydride mixture.

7. A stable cyclic dibasic acid anhydride mixture which is liquid at temperatures from about 0° C. to 30° C. consisting essentially of about 10 to 27 weight parts of tetrahydrophthalic anhydride and about 73 to 90 weight parts of hexahydrophthalic anhydride and ethylene glycol in an amount between about 0.02 to 4 percent by weight of said anhydride mixture.

8. A stable cyclic dibasic acid anhydride mixture which is liquid at temperatures from about 0° C. to 30° C. consisting essentially of about 10 to 27 weight parts of tetrahydrophthalic anhydride and about 73 to 90 weight parts of hexahydrophthalic anhydride and methanol in an amount between about 0.02 to 4 percent by weight of said anhydride mixture.

References Cited by the Examiner

UNITED STATES PATENTS

| | | | |
|---|---|---|---|
| 2,947,712 | 8/1960 | Belanger et al. | 260—18 |
| 3,000,848 | 9/1961 | McGary et al. | 260—18 |
| 3,015,643 | 1/1962 | Markhart et al. | 260—18 |
| 3,035,001 | 5/1962 | Tinsley et al. | 260—18 |
| 3,078,235 | 2/1963 | Bowman et al. | 252—182 |

JULIUS GREENWALD, *Primary Examiner.*

ALBERT T. MEYERS, *Examiner.*